Nov. 24, 1925.

C. P. DEIBEL 1,562,945

METHOD OF MAKING DRY BATTERIES

Filed Jan. 12, 1923   3 Sheets-Sheet 1

Inventor
Cyril P. Deibel
By Hull, Brock & West
Att'ys.

Nov. 24, 1925.
C. P. DEIBEL
1,562,945
METHOD OF MAKING DRY BATTERIES
Filed Jan. 12, 1923 3 Sheets-Sheet 2
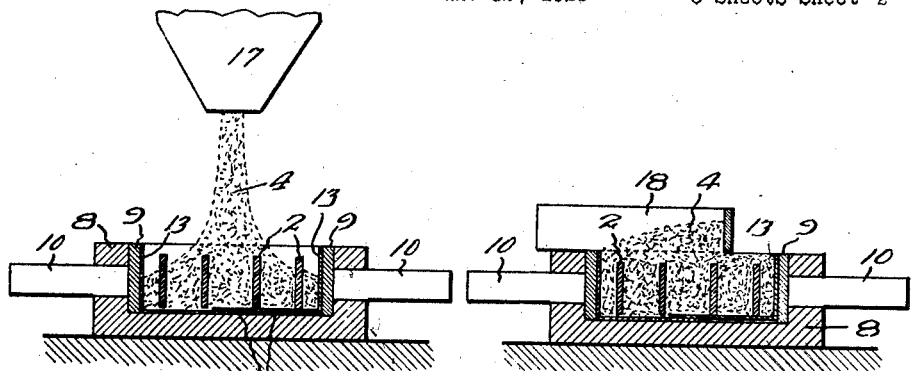
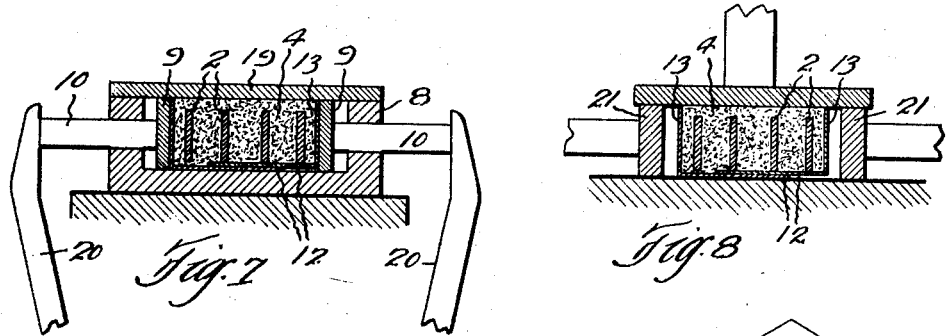
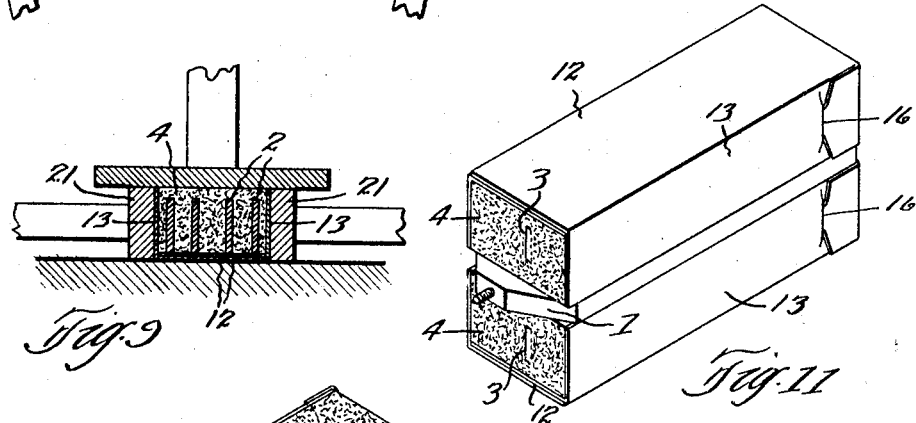
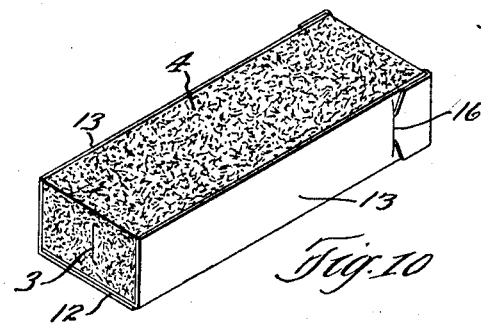

Nov. 24, 1925.  1,562,945
C. P. DEIBEL
METHOD OF MAKING DRY BATTERIES
Filed Jan. 12, 1923   3 Sheets-Sheet 3

Inventor
Cyril P. Deibel
By Hull, Brock &West.
Attys.

Patented Nov. 24, 1925.

1,562,945

UNITED STATES PATENT OFFICE.

CYRIL P. DEIBEL, OF YOUNGSTOWN, OHIO, ASSIGNOR TO THE TWIN DRY CELL BATTERY COMPANY, OF CLEVELAND, OHIO, A CORPORATION OF OHIO.

METHOD OF MAKING DRY BATTERIES.

Application filed January 12, 1923. Serial No. 612,232.

*To all whom it may concern:*

Be it known that I, CYRIL P. DEIBEL, a citizen of the United States, residing at Youngstown, in the county of Mahoning and State of Ohio, have invented a certain new and useful Improvement in Methods of Making Dry Batteries, of which the following is a full, clear, and exact description, reference being had to the accompanying drawings.

This invention relates to a method of making dry batteries and has particular reference to the formation of a dry battery similar to that disclosed in Patent Number 1,271,933 issued to Herbert R. Palmer on July 9, 1918.

The primary object of the present invention is to provide an improved method of constructing a dry cell of the type referred to, and wherein the manufacture of the battery is expedited, the cost of production lessened, and the advantages and characteristics peculiar to the aforesaid type of cell are maintained. Further and more limited objects will become apparent as the description proceeds.

Figure 1:
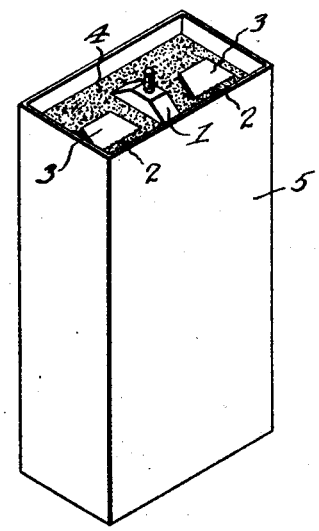
Figure 2:
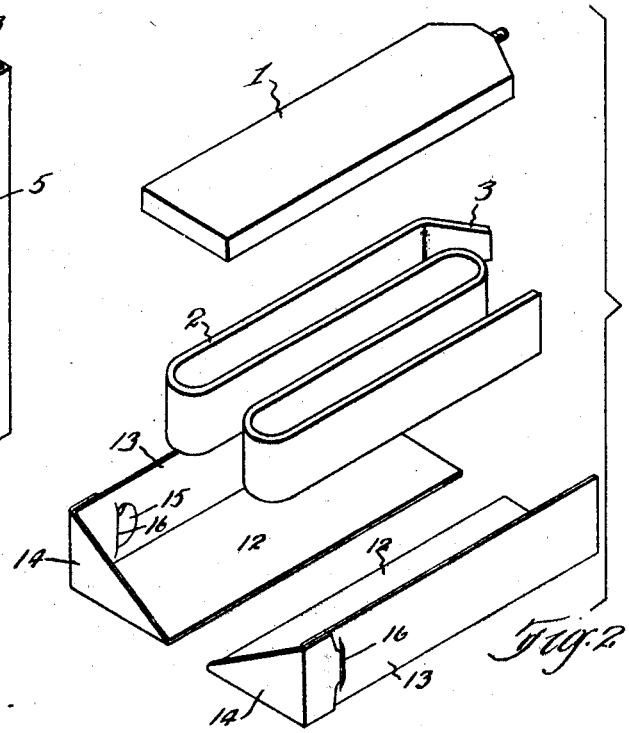
Figure 3:
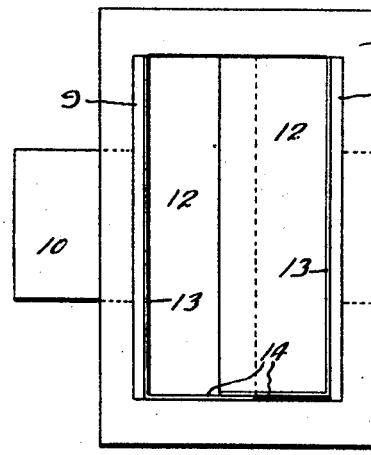
Figure 4:
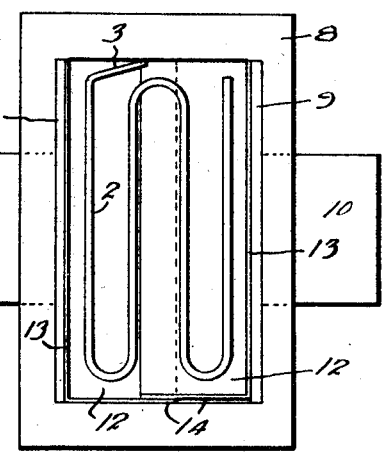
Figure 12:
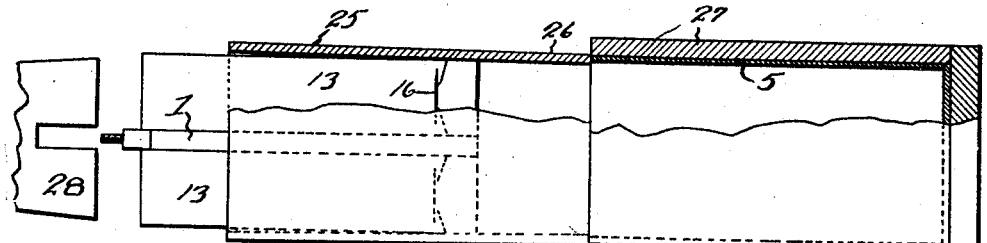
Figure 13:
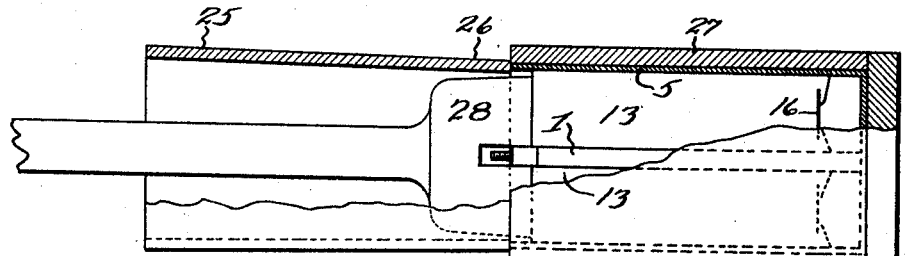
Figures 14, 15:
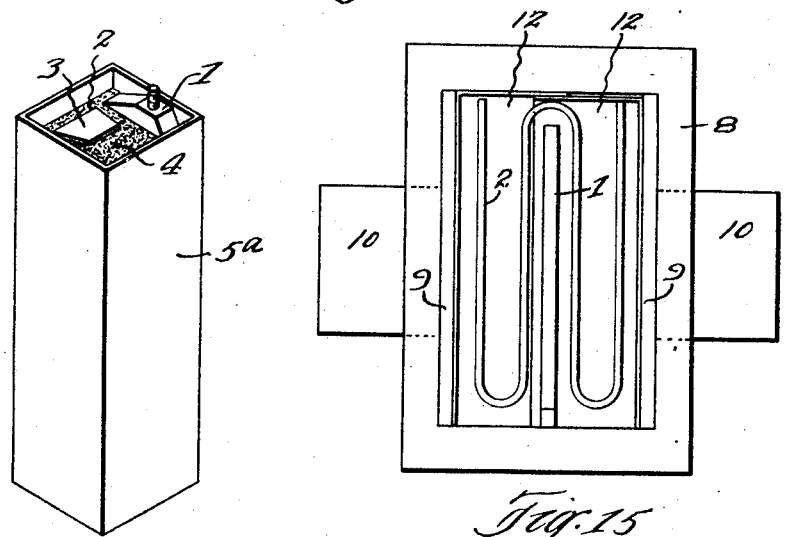

In the accompanying drawings Fig. 1 is a perspective view of a battery constructed in accordance with my invention; Fig. 2 is a perspective view of the several elements entering into one half of the cell and showing the relative positions thereof; Figs. 3 and 4 are plan views illustrating respectively the first and second steps of my process; Figs. 5, 6, 7, 8 and 9 are vertical sectional views illustrating respectively the third, fourth, fifth, sixth and seventh steps of my process; Fig. 10 is a perspective view of a unit constituting one half of the battery cell; Fig. 11 is a perspective view of two of the aforesaid units with a cathode interposed therebetween and the whole ready for insertion in a carton; Figs. 12 and 13 are side elevations with parts broken away, and illustrating the eighth and ninth steps of my process; Fig. 14 is a perspective view of a modified form of cell which may be constructed in accordance with my process; and Fig. 15 is a plan view illustrating a still further modification which may be constructed in accordance with my invention.

Referring particularly to Figs. 1 and 2, the present embodiment of dry cell includes a flat carbon element or cathode 1, with duplicate zincs or anodes 2 arranged on opposite sides thereof and out of contact therewith. The anodes are approximately W-shaped in form and a side branch of each anode has the upper portion thereof deflected inwardly as indicated at 3 for a purpose to be referred to hereinafter. The two anodes and the cathode and a battery mix 4 are placed within a carton 5 in accordance with my improved process. Carton 5 may be formed from any suitable waterproof and non-conductive material or from material which has been treated to render it waterproof and a non-conductor.

The process is carried out with the aid of a rectangular mold 8 which has side plates 9 loosely mounted therein and a plunger 10 projecting through each side of the mold and contacting with its respective side plate. Referring to Fig. 3 it will be seen that the first step consists in placing a pair of cardboard containers 12 within the mold in overlapping relation. These containers, as shown in Fig. 2, each consists of a flat sheet of cardboard whose side edge is bent upwardly to form a side wall 13 and whose end edge is bent upwardly to define a triangular end wall 14 which extends about said side wall and is locked thereto by a tongue 15 engaged in a slit 16. After the containers have been positioned in the mold in overlapping relation, an anode is placed therein with the portion 3 thereof in contact with an end wall of the mold as shown in Fig. 4. It will be understood that the anode has been previously enveloped in a suitable porous material (not shown) which serves as a separator between the battery mix and anode. This step is common in the art and a detailed description thereof is deemed unnecessary. Referring to Figs. 5–10 inclusive it will be seen that the mold is next filled with battery mix 4 from any suitable source 17 and then levelled by means of a scraper 18. A top plate 19 is then positioned over the mold and the plungers 10 compressed, as by means of a pair of tongs 20. This serves to compress the battery unit slightly so that it may be conveniently removed from this mold and placed within another mold 21 wherein pressure is applied to each side and the top of the mold to compress said unit to a predetermined size. The unit when removed from mold 21 presents the appearance shown in Fig. 10. In preparing these units for the production of a quantity of batteries, one half of the total number required are made with the anode turned in one direction while the other half are made with the anode turned in the opposite direction so that, when assembled in reverse relation on opposite sides of the cathode, the deflected portions 3 of the two anodes extend in the same direction as shown in Fig. 1.

As intimated above, a battery cell is formed by placing a carbon or cathode element between and in contact with the open or exposed faces of two units as shown in Fig. 11. One of these units is formed in accordance with the above detailed description and the other unit is preferably formed with the anode positioned on its opposite side as above referred to, so that when the battery cell is assembled, the deflected portions 3 of the anodes will be on the same side of the battery and thus facilitate connection of these elements. A cell thus assembled is next inserted within a rectangular tube 25, one end of which is slightly tapered as indicated at 26, and this tapered end is positioned in contact with the open end of a mold 27. Mold 27 is adapted to receive a carton 5 with the open end thereof adjacent the open end of the mold. As shown in Figs. 12 and 13, the tapered end of tube 25 is slightly smaller than the open end of carton 5 so that the battery cell will enter said carton when extruded from said tube by means of a ram 28.

The cell is then removed from mold 27 and presents the appearance shown in Fig. 1. The remaining steps, of electrically connecting the two anodes and providing one of them with a terminal post, filling the top of the carton with sealing compound, and labelling the cell, form no part of the present invention and hence a detailed description thereof is deemed unnecessary.

In Fig. 14 I have shown a modified form of battery cell which may be constructed in accordance with my process. This cell consists of a carton 5$^a$ having a cathode 1 and an anode 2 identical with those previously described, the same being separated and surrounded by the battery mix 4. In forming this type of cell, a unit constructed as previously described, and a cathode laid on the open side thereof are extruded through a tube and into the carton 5$^a$ in a manner similar to that described above.

In Fig. 15 I have shown a still further modification wherein a W-shaped anode 2, as before, is employed and in this instance the cathode or carbon 1 is positioned in the central space or sinus of the anode. The cell is then compressed and extruded into a carton in the same manner as described in detail above.

Having thus described my invention, what I claim is:

1. The method of forming a battery cell which consists in the steps of first compressing a quantity of battery mix with an anode in an open sided container, second placing a cathode in contact with the compressed mix exposed through the open side of the container, and third compressing the cell thus formed and by the same operation inserting said cell into a permanent carton.

2. The method of forming a battery cell which consists in the steps of first providing an open sided container, second placing an anode and a quantity of battery mix within said container, third compressing said battery mix and container about said anode to form a unit, fourth placing a cathode in contact with the compressed battery mix exposed through the open side of the container, and fifth compressing the cell thus formed and by the same operation inserting said cell into a permanent carton.

3. The method of forming a battery cell which consists in the steps of first providing a two part open sided container, one section of which overlaps the other, second placing an anode within said container and filling the container with battery mix, third leveling the battery mix with the container, fourth compressing the container sections and battery mix to cause a further overlapping of said container sections and form a unit, fifth placing a cathode in contact with the compressed battery mix exposed through the open side of the container, and sixth compressing the cell thus formed and binding the elements thereof together.

4. The method of forming a battery cell which consists in the steps of first providing a two part container, each section of which consists of a bottom, end and side wall, and arranging said sections with the bottoms thereof in overlapping relation, second placing an anode within said sections and filling the container with the battery mix to embed said anode therein, third partially compressing the container sections and battery mix to cause a further overlapping of said container sections and thereby form an integral unit, fourth compressing said unit to a predetermined size, fifth placing a cathode in contact with the exposed surface of the compressed mix, sixth compressing the cell, thus formed, and seventh placing the cell into a carton.

5. The method of forming a battery cell which consists in the steps of first partially compressing a battery mix about an anode so as to form a unit, second compressing said unit to a predetermined size, and third placing a cathode in contact with the compressed mix, and fourth compressing the cell thus formed and by the same operation inserting said cell into a permanent carton.

6. The method of forming a battery cell which consists in the steps of first placing an anode and a cathode in contact with a battery mix, and second compressing the cell thus formed to a predetermined size and as a part of the same uninterrupted operation inserting said cell into a permanent carton.

7. The method of forming a battery cell which consists in the steps of first forming two units each consisting of an anode embedded in a quantity of battery mix, second placing a cathode in contact with the battery mix of each of said units, and third compressing the cell thus formed and as a part of the same uninterrupted operation inserting said cell into a permanent carton.

8. The method of forming a battery cell which consists in the steps of first partially compressing a quantity of battery mix about an anode, second compressing said battery mix and anode to a predetermined size, third placing a cathode in contact with the compressed battery mix, fourth compressing the cell thus formed to a predetermined size, and fifth binding the elements of said cell together.

In testimony whereof, I hereunto affix my signature.

CYRIL P. DEIBEL.